W. S. JAMESON.
AUTOMOBILE LOCK.
APPLICATION FILED AUG. 16, 1919.
1,347,463.
Patented July 20, 1920.
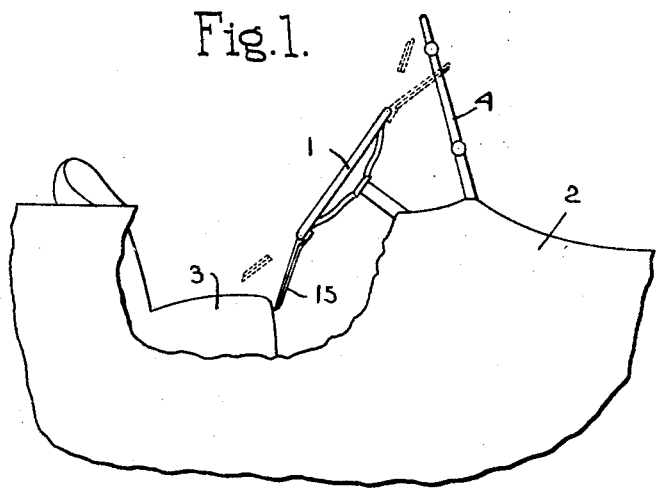
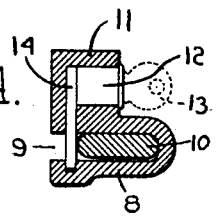
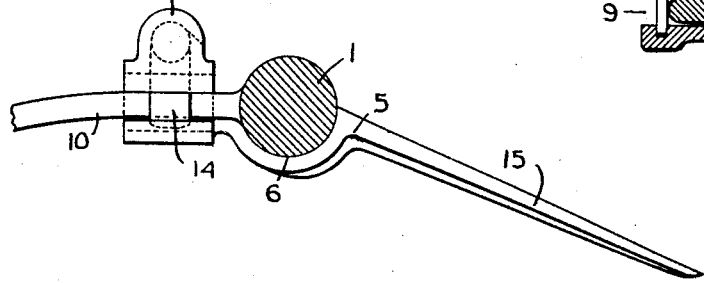
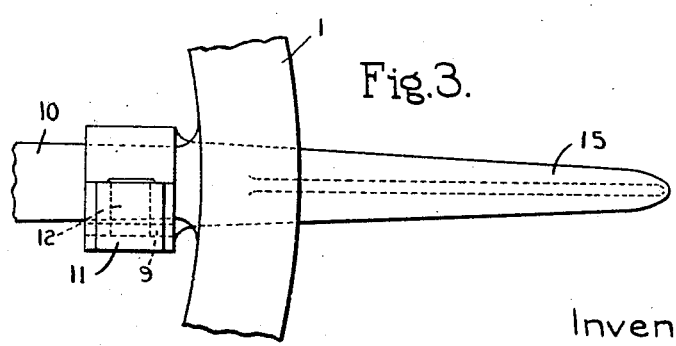
Inventor.
Winthrop S. Jameson
by Heard Smith & Tennant.
Attys.

UNITED STATES PATENT OFFICE.

WINTHROP S. JAMESON, OF BELMONT, MASSACHUSETTS.

AUTOMOBILE-LOCK.

1,347,463.　　　　　Specification of Letters Patent.　　Patented July 20, 1920.

Application filed August 16, 1919. Serial No. 317,868.

*To all whom it may concern:*

Be it known that I, WINTHROP S. JAMESON, a citizen of the United States, and resident of Belmont, county of Middlesex, State of Massachusetts, have invented an Improvement in Automobile-Locks, of which the following description, in connection with the accompanying drawing, is a specification, like characters on the drawing representing like parts.

This invention relates to improvements in locking devices for automobiles and the object thereof is to provide a device which will hinder the steering of the car so as to prevent stealing of the automobile.

Many street regulations require that an automobile parked upon the street must not be locked so that it cannot be removed in case of emergency. One of the objects of the present invention is to provide a locking device adapted to be secured to the steering wheel of an automobile which will interfere with the free steering of the automobile.

A further object of the invention is to provide a locking device of the character described which will permit the automobile to be run in a straight course but which will interfere with its turning laterally in one direction.

Other objects and features of the invention will more fully appear from the following description and the accompanying drawings and will be pointed out in the annexed claims.

In the drawings,

Figure 1 is a view of a section of the body of an automobile partly broken away showing the seat, steering wheel and wind shield with a preferred embodiment of my invention applied to the steering wheel, Fig. 2 is a detail sectional view through the rim of the steering wheel illustrating a locking device embodying a preferred form of my invention located upon the spoke of said steering wheel, Fig. 3 is a plan view of the same, and, Fig. 4 is a transverse sectional view through the locking means and spoke of the steering wheel illustrated in Fig. 2.

The invention is illustrated in the accompanying drawing as applied to the steering wheel 1 of an automobile comprising a body 2, a seat 3 and wind shield 4. The locking device comprises a bar 5 preferably having a curved socket portion 6 adapted to fit the rim 7 of the steering wheel 1 and a locking portion comprising a boss 8 having an open slot 9 to receive a spoke 10 and a steering wheel. The boss 8 is provided with an upward extension or thickened portion 11 to receive or contain a lock for securing the device in place upon the spoke. As disclosed herein the lock may conveniently be in the form of a pin lock having a barrel 12 adapted to be rotated by a key 13 the barrel 12 being suitably constructed to accommodate a bolt 14 which may be extended across the slot 9 to lock the device in position or retracted therefrom to release said locking device from a spoke.

The bar 5 is provided with an extension 15 preferably of sufficient length to engage the wind shield or some other stationary portion of the car when the steering wheel is turned in one direction thereby preventing the turning of the steering wheel of the car any considerable distance in one direction from the position in which the car is stopped.

The locking device may be clamped upon a spoke of the steering wheel either in such position as to engage the wind shield as illustrated in dotted lines in Fig. 1 or when the operator is seated in the driving seat to strike against the legs of the operator when the steering wheel is turned in either direction, thereby rendering the steering of the machine inconvenient.

In order to prevent the convenient operation of the steering wheel sufficiently to avoid the likelihood of the car being stolen or used by an unauthorized person but still to enable the car to be steered in any direction the extension 15 of the locking bar 5 desirably is offset from the plane of the radii of the rim of the steering wheel so that if the locking device is clamped to a spoke of the hand wheel in a reverse position the end of the bar may be made to project into the positions indicated by the dotted lines indicating the end of said extension in Fig. 1. When the locking device is thus clamped upon the steering wheel it will engage no obstruction so that the wheel may be rotated to steer the car in any direction as is necessary at times in placing the car in a garage but the locking device will be so positioned as to engage the body of a driver sitting in the driving seat, thereby rendering the manipulation of the wheel inconvenient and thus discouraging the unauthorized use of the car.

As an alternative form one or more of the spokes of the steering wheel may be provided with a socket in which a suitable lock may be secured and a bar or extended member having coöperating locking means inserted in the socket thus formed in the spoke of the steering wheel.

It will therefore be understood that the embodiment of the invention disclosed herein is illustrative and not restrictive and that various modifications in structure may be made within the spirit and scope of the following claims.

Having thus described my invention what I claim as new and desire to secure by Letters Patent is:

1. An automobile locking device comprising a rigid member having means for adjustably locking the same to the steering wheel of an automobile and an extension of sufficient length to engage a rigid portion of the automobile upon rotation of said steering wheel whereby the free steering of the automobile will be prevented.

2. An automobile locking device comprising a rigid member having means for locking the same to the wheel of an automobile, said member having an extension of sufficient length to engage the wind shield upon rotation of the steering wheel.

3. An automobile locking device comprising a bar having a socket to fit the rim of the steering wheel of an automobile, means for detachably locking said bar to said wheel and an extension of sufficient length to pass closely to the driver's seat when the wheel is rotated to steer the automobile and thereby to prevent the operator from steering when seated in the driver's seat.

4. An automobile locking device comprising a bar having a socket to fit the rim of the steering wheel of an automobile, locking means adapted to engage the spoke of said wheel and an extension of sufficient length to engage the wind shield of the automobile, said extension being offset sufficiently so that when secured to the wheel in reversed position free rotation of the wheel will be permitted.

5. An automobile locking device comprising a reversible rigid member having means for detachably locking the same to the steering wheel of an automobile and an offset extension of such length that when secured in one position it will engage a rigid portion of the automobile and when reversed will pass closely to the driver's seat when the wheel is rotated to steer the automobile and thereby prevent the operator from steering when seated in the driver's seat.

In testimony whereof, I have signed my name to this specification.

WINTHROP S. JAMESON.